United States Patent [19]

Gombert et al.

[11] Patent Number: 4,853,258

[45] Date of Patent: Aug. 1, 1989

[54] METHOD FOR THE IMPERVIOUS METALLIC COATING OF AN OPTIC FIBER AND DEVICE

[75] Inventors: Jean Gombert, Verrieres le Buisson; Christian Quinty, Gif sur Yvette; Maryse Gazard, Puteaux; Serge Blaison, Villebon, all of France

[73] Assignee: Thomson-CSF, Paris, France

[21] Appl. No.: 68,189

[22] Filed: Aug. 30, 1987

[30] Foreign Application Priority Data

Jun. 30, 1986 [FR] France ................... 86 09442

[51] Int. Cl.⁴ .......................... B05D 5/06; B05C 3/02; C23C 14/00
[52] U.S. Cl. ...................... 427/169; 118/50; 118/404; 118/405; 427/404; 427/407.2; 427/432; 427/434.2; 427/434.6; 427/434.7
[58] Field of Search ............... 427/169, 357, 431, 432, 427/434.2, 434.6, 434.7, 404, 407.2; 118/50, 404, 405, 350, 367

[56] References Cited

U.S. PATENT DOCUMENTS

| | | | |
|---|---|---|---|
| 3,227,577 | 1/1966 | Baessler et al. | 118/405 |
| 3,813,260 | 5/1974 | Lipstein | 118/405 |
| 4,390,589 | 6/1983 | Geyling | 427/431 |
| 4,402,993 | 9/1983 | Aisenberg et al. | 427/163 |
| 4,539,226 | 9/1985 | Pack et al. | 427/169 |
| 4,644,898 | 2/1987 | Jochem | 118/405 |

FOREIGN PATENT DOCUMENTS

| | | |
|---|---|---|
| 60-16827 | 6/1985 | Japan . |
| 60-131843 | 11/1985 | Japan . |
| 2105618 | 3/1983 | United Kingdom . |

*Primary Examiner*—Janyce Bell
*Attorney, Agent, or Firm*—Oblon, Spivak, McClelland, Maier & Neustadt

[57] ABSTRACT

The invention pertains to a method for metallic coating according to which the fiber is made to pass through a bath of molten metal. To prevent unevennesses in coating, caused by turbulence, a depression is made above the bath.

The invention also pertains to a device by which the method is applied. The fiber goes vertically through a pot containing the molten metal above which the depression is made.

The invention can be used to make optic fibers of greater mechanical strength.

21 Claims, 3 Drawing Sheets

FIG_1
PRIOR ART
FIG_2
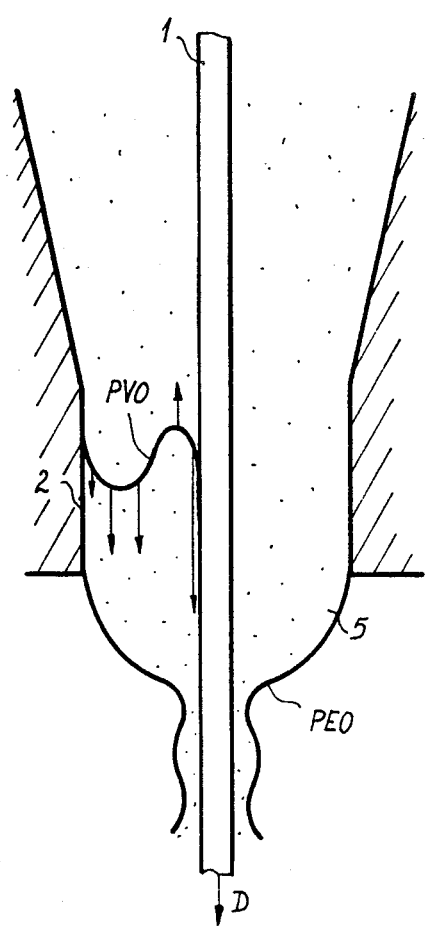
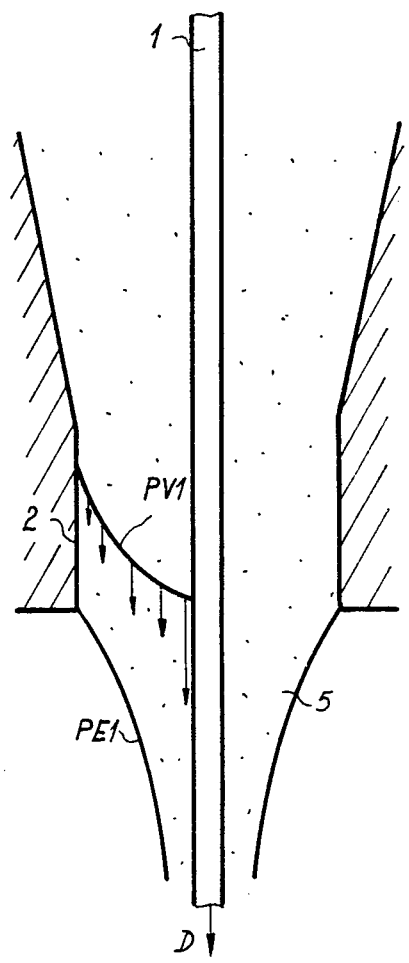

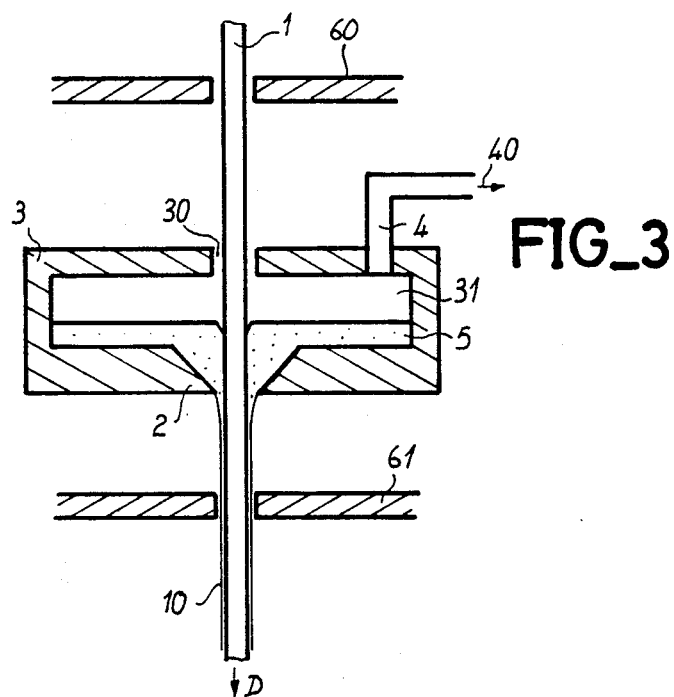
FIG_3
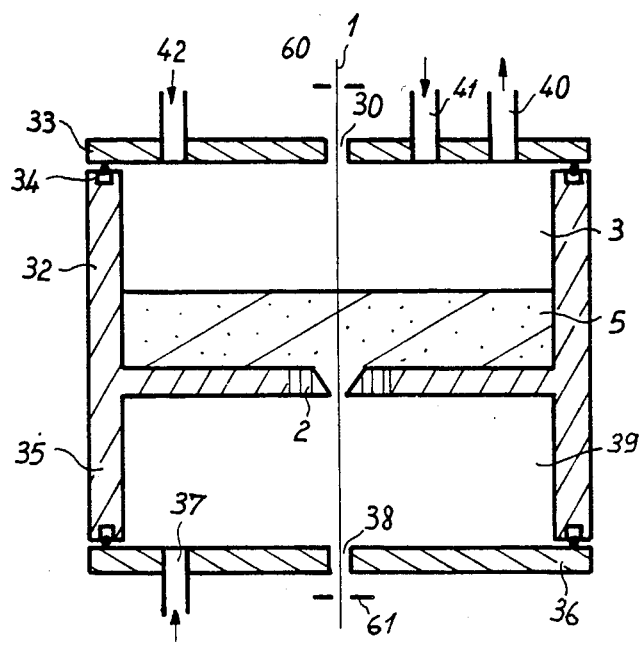
FIG_4

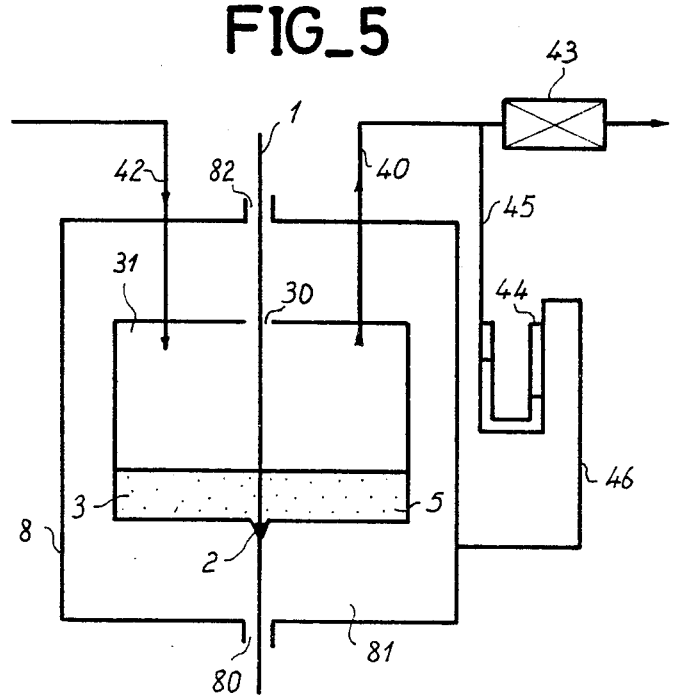
FIG_5
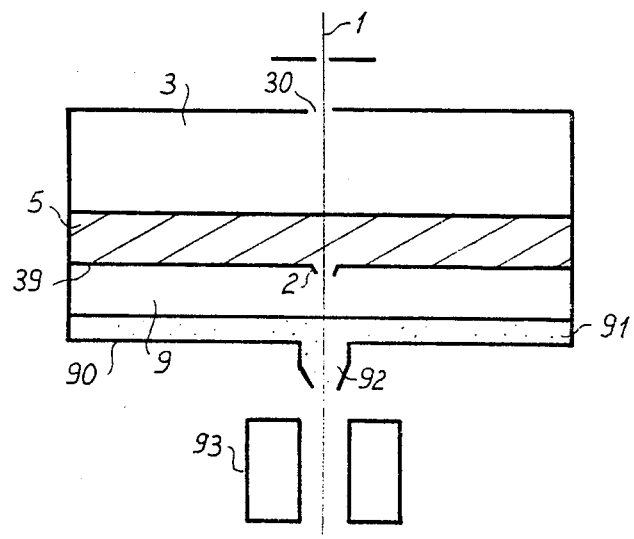
FIG_6

METHOD FOR THE IMPERVIOUS METALLIC COATING OF AN OPTIC FIBER AND DEVICE

FIELD OF THE INVENTION

The invention pertains to a method for the impervious metallic coating of an optic fiber and a device for the application of this method, the coating being done with the aim of eliminating the static fatigue of fibers, i.e., the reduction of their mechanical strength with time.

Background of the Invention

According to prior art techniques, optic fibers based on silica glass are shielded from the external atmosphere by organic linings (such as nylon, silicone, epoxy acrylate, etc.) These linings are neither impervious nor free of water. Water may spread up to the glass where, when the glass comes under stress, it causes a corrosion specific to the place where the diffusion potential is at its highest, i.e. at the center of the cracks. The cracks exist intrinsically on the surface of the glass or may be provoked by mechanical friction. The concurrent action of the water and of a stress is reflected in a growth of cracks which may reduce the mechanical strength until the fiber itself breaks spontaneously under very low stresses. This phenomenon, known as "corrosion under stress" or "static fatigue", may be quantified by the following equation:

$$\text{Log } t_s = -n \log \sigma_s + K,$$

where:
- $t_s$ is the time at the end of which the fiber breaks under the stress $\sigma_s$,
- K is a constant,
- n is a constant that describes the aging of the fiber.

The greater the value of n, the less the fiber ages (n = 30 for a conventional telecommunications fiber of very good quality).

To stop this process, therefore, it is necessary either to eliminate all stresses (which is impossible in practice, since a fiber comes under stresses as soon as it is curved) or to eliminate all traces of water in contact with the glass of the fiber. For this, it is enough to deposit, on this glass, a lining which is impervious and does not retain any water. Several materials possess this property:

- Ceramics, such as silicon oxynitrides or aluminium oxynitrides, silicon nitride, silicon carbide or hydrogenated carbon (diamond-like carbon),
- Metals (indium, aluminium, nickel, gold, etc.)

With respect to ceramics:

Ceramic deposits are made either by C.V.D. or by plasma depositing under vacuum. In both cases, the depositing speeds are very low (ranging from a few Å/s to a few tens of Å/s) and require very long reactors and/or several passages of the fiber. The machines with which depositing operations of this type can be done are, therefore, very expensive. The ceramics are very hard and may sometimes damage the surface of the fiber, bringing about a reduction in the initial mechanical strength. Furthermore, C.V.D. depositing is done under heat (600° to 1000° C.), thus limiting its application to silicon fibers.

With respect to metals:

Metals may also be deposited under vacuum by plasma depositing or magnetron spraying. The same depositing difficulties and restrictions apply as with ceramics deposited under vacuum.

The metallic lining may also be made by passing the fiber through a molten metal. Several metals can be used in this case:

The fiber may be passed into an aperture or ring in which the metal is held by surface tension. The difficulty then lies in having to very rigorously control the incoming flowrate of the liquid metal so that there is neither an excess of material, which would result in the coating being in the form of drops, nor too little material, which would lead to insufficient coating.

Passing the fiber into a bath of molten metal and a fiber guide in a way similar to the method used for plastic coating.

However, it is difficult to obtain an evenly thick coating which is centered on the fiber, owing to the existence of turbulence in the molten metal bath when the fiber is passed through it.

OBJECT OF THE INVENTION

This is why the invention pertains to a method and a device which can be used to resolve this difficulty so as to make an even metallic coating on the fiber.

SUMMARY OF THE INVENTION

The invention therefore pertains to a method for the impervious metallic coating of an optic fiber, wherein the coating material is molten metal, wherein the coating is done by passing the fiber into a fiber guide above which there is the molten metal, and wherein a depression is to be created above the molten metal.

The invention also pertains to a device for the impervious metallic coating of an optic fiber using the above method. The device comprises a pot, containing a molten metal in a chamber. The upper part of the pot possesses a hole for the passage of a fiber, and the bottom of the pot comprises a fiber guide located in alignment with the hole for the outlet of the fiber. The device also comprises means to make a depression in the chamber.

BRIEF DESCRIPTION OF THE DRAWINGS

The various objects and features of the invention will be seen more clearly in the following description made with reference to the appended figures, of which:

FIG. 1 is an example showing the flow of a fluid metal around the fiber with turbulence;

FIG. 2 is an example showing the flow of a fluid metal around a fiber in a stable state;

FIG. 3 is a first embodiment of a metallic coating device according to the invention;

FIG. 4 is a second embodiment of a metallic coating device according to the invention;

FIG. 5 is a third embodiment of the metallic coating device according to the invention;

FIG. 6 is a fourth embodiment of a metallic coating device also comprising a device for polymer coating.

DETAILED DESCRIPTION OF THE INVENTION

We shall first describe the method of the invention used to make a continuous and a centered metallic coating around an optic fiber. The method has the advantage by which it is possible to deposit either the metal alone or the metal followed by another coating (such as a polymer) by means of a simple, compact device.

The difficulty of coating with a molten metal arises from the very low viscosity of the metal. It is possible to show that, as a first estimate, the return force exerted on the fiber in a fiber guide is proportionate to the viscosity of the liquid used for coating. Now, when changing from a polymer to a molten metal, there is a change from a viscosity of a few tens of poises to a few centipoises, as a result of which the centering force is reduced in the same ratio.

The choice of the metal is conditioned by:
Its melting temperature below 1000° C.,
Its adhesion to silicon,
Its inertia with respect to silicon,
Its hardness (which should not be too great in order to avoid the creation of micro-curves).

Thus there is a whole series of heavy metals, which have a sufficiently low melting point and a low hardness (In, Bi, Sn, Pb) as well as aluminium which adheres to silicon and shows greater resistance to abrasion than heavy metals. However, the hardness of aluminium, which is greater than that of indium for example, will cause more losses by micro-curves, especially in multiple-mode fibers.

The metals which can be used have a high density when molten, and their hydrostatic pressure will therefore also be high, even for small heights of metal in the coating tub. In particular, the devices used for the polymer coating of the fibers provide for passing the fiber to be coated in a bath and provide, at the bottom of the tub, at the outlet of the bath, for a fiber guide through which the fiber passes, making it possible to calibrate the thickness of the coated layer. Thus, the hydrostatic pressure mentioned above may be the cause of hydrostatic disturbances.

The invention therefore pertains to a method which can be used to remove this disadvantage.

According to the method of the invention, it is planned to create, above the molten metal bath, a depression by which the hydrostatic pressure can be reduced during the passage of the fiber in the bath and through the fiber guide.

By reducing the excessively high hydrostatic pressure, this method makes it possible to obtain laminar flow conditions with metals which may have viscosities of a few centipoises.

Furthermore, the method of the invention can also be used to prevent the oxidation of the metal used to coat the fiber. This is because should the metal become oxidized, even partially, there is a major risk that the oxide will scratch the fiber and damage it.

The method of the invention therefore provides for conducting the coating process in an inert atmosphere.

Finally, the method of the invention also provides for guiding the fiber upstream and downstream of the fiber guide so as to keep the fiber in the axis of the fiber guide, thus making it possible to compensate for the very small centering forces caused by the low viscosity of the molten material.

The method of the invention can thus be used to make deposits a few micrometers thick on the production line and in a single passage. The coating obtained is uniform, and a fiber thus coated with metal will preserve its mechanical strength almost entirely in the course of time (with losses of less than 10% in 10 years), whereas a conventional fiber of excellent mechanical quality, lined with epoxy acrylate, would lose 50% of its mechanical quality during the same period.

According to one alternative method of the invention, there is provision for one or more stages in which the molten metal is rinsed before the process for coating with molten metal. Specifically, the metal is cleaned before it is melted, and the molten metal is kept in a neutral gas until it is used. This is done, for example, in the case of indium In order to prevent very hard particles of indium oxide from remaining and scratching the fiber (reducing the mechanical strength until it causes, in certain cases, breakage during fiber drawing), the raw metal was cleaned and then melted in a box under dry nitrogen.

The following method was chosen and is given by way of example.

The indium is placed for one minute, under agitation, at ambient temperature in the following solution:
One volume of concentrated hydrochloric acid,
Two volumes of oxygenated water at 30%,
Four volumes of de-ionized water.

After the three rinsings with de-ionized water, and three rinsings with propanol, the indium is dried and melted in a box under nitrogen and then poured into the coating tub. Before cooling, the surface is lined with freon. The coating tub is then removed from the box and placed in the chamber on the fiber-drawing tower, and the freon is evaporated by heating at 80° C. under argon.

The indium thus prepared has a bright surface condition. The fiber at the start of the fiber-drawing stage very easily penetrates the coating tub, and there is no longer any breakage observed during fiber-drawing.

The preparation (de-oxidizing) and conditioning of the indium before coating is therefore an important stage if it is sought to make the fiber preserve its initial mechanical strength.

According to another alternative method of the invention, after passing through a fiber guide, the fiber passes into an outlet chamber containing a neutral gas and traces of oxygen to control the surface tension of the metal at the outlet of the fiber guide (a few per cent of oxygen at the maximum).

FIGS. 1 and 2 show a fiber 1 passing through a fiber guide 2 along a direction D. There is a coating fluid 5, such as a molten metal, in the fiber guide 2. If the method of the invention is not applied, the pattern of speeds of the flow of fluid in the fiber guide 2 has the shape shown by the curve PVO in FIG. 1 with speeds varying unevenly starting from the edge of the fiber guide 2 and going towards the fiber 1. At the outlet of the fiber guide 2, the fluid flow pattern has a shape PEO of a type showing irregularities such that the fiber may exhibit coating faults.

By contrast, as shown in FIG. 2, the method of the invention gives a fluid flow speed pattern PV1 such that the speeds of the fluid increase evenly between the fiber guide 2 and the fiber 1. The flow profile PE1 is then even and gives a uniform coating of the fiber 1.

Referring to FIG. 3, we shall describe a metallic coating device according to the invention which is used to apply the method described above.

This device comprises a pot 3 heated by means which are not shown, this pot containing a molten metal 5 in a chamber 31. The pot 3 is made of a material that depends on the nature of the metal 5. It may, for example, be made of borium nitride or aluminium when the metal 5 is made of aluminium, or it may be made of stainless steel for indium.

In its upper part, the pot 3 has a hole 30 providing for the passage of the fiber 1. Aligned with the hole 30, at the lower part, there is a fiber guide 2 provided with a hole for the passage of the fiber 1. The hole of the fiber guide 2 is of a size that lets through a specified quantity of molten metal 5 at the same time as the fiber 1. The fiber guide 2 thus calibrates the thickness of the metallic lining made on the fiber 1. Furthermore, guides 60 and 61 keep the fiber 1 in the axis of the hole 30 and the fiber guide 2.

The chamber 31 of the pot 3 contains a limited quantity of molten metal 5 such that the height of the metal 5 exerts a minimum pressure on the fiber guide 2. Furthermore, to apply the method of the invention, the pot 3 has a hole 4 connected to a pumping device which is not shown, by a tube 40. The hole 4 makes it possible to make a depression in the chamber 31, above the level of the molten metal 5. As explained earlier in the description of the method, this depression gives a laminar flow of the molten metal 5 around the fiber 1, and, consequently, an even coat.

Referring to FIG. 4, we shall now describe a detailed example of an embodiment of the device according to the invention.

This device comprises a pot 3 bounded by walls 32. The pot 3 is enclosed by a machined lid 33 resting on the walls 32 by sealing means 34. The following are provided for in the lid 33:
   A tube 41 to let in a coating material such as indium,
   A tube 42 to let in a neutral gas,
   A discharge tube 40 used to make a depression in the pot 3.

Under the pot 3, there is also an outlet chamber 39 bounded by walls 35 and a lid 36. The lid 36 comprises a tube 37 used to let in a particular gas.

The lids 33 and 36 comprise holes 30 and 38 used for the passage and guiding of the fiber 1. Other guides 30 and 31 can also be provided for.

The device of FIG. 4 sets up a depression in the pot 3 with reference to the outlet chamber 39. Thus, this device can also work by using the tube 37 to set up a slight overpressure in the outlet chamber 39. If the pressures in the pot 3 and the outlet chamber 39 are designated p0 and p1 respectively, it is essential that there should be a difference $p1-p0=\Delta p$ between these pressures such that $p0 < p1$.

The neutral gas introduced by the tube 42 in the pot 3 prevents the oxidation of the molten metal 5 which could cause imperfections in the coating of the fiber 1.

Although it is not necessary, it is possible to provide for filling the outlet chamber 39 with a gas making it possible to control the value of the surface tension of the metal at the outlet of the fiber guides. For this, the tube 37 will be used for example.

Referring to FIG. 5, we shall now decribe an alternative embodiment of the device according to the invention.

According to this alternative, the device has a dual chamber system. The pot 3 comprising the chamber 31 is contained in a second chamber 81, the walls 8 of which completely surround the chamber 31.

A pump 43 is used to set up a depression in the chamber 30 through the tube 40. An instrument 44 to measure the difference in pressure is connected by a tube 45 to the tube 40 (hence to the chamber 31) and by a tube 46 to the chamber 81. The instrument 44 thus makes it possible to measure the difference in pressure existing between the two chambers 31 and 81 and, consequently, controls the pump 43 so that it establishes and maintains a pressure difference with a determined value.

In this device, the tube 42 crosses the chamber 81 and feeds the chamber 31 with neutral gas.

The fiber 1 crosses the chamber 81 through holes 82 and 80 and the chamber 31 through a hole 30 and the fiber guide 2.

Another alternative embodiment of the device of the invention, shown in FIG. 6, consists in replacing the aligning device located below the pot with a polymer coating system comprising a polymer tub which is used both as an aligning device and a damper for the fiber. The coating tub may be located outside or inside the sealed chamber. In a configuration of this type, the fiber 1 is coated first with a metal and then with a polymer. However, it is possible to preserve the aligning device beneath the metallic coating pot while keeping the polymer coating tub downstream of this device.

It is indispensable to coat the metal with a polymer in the case of soft metals (indium for example) which are easily scratched by simple mechanical contact. An epoxy acrylate coating on metallic coating will protect the metal from scratches.

Thus, in FIG. 6, the pot 3 contains the molten metal bath 5 which is associated with a polymer coating chamber 9 containing a bath of a polymer material 91. The fiber 1 crosses the pot 3 and the bath 5 through the opening 30 and the fiber guide 2, then the chamber 9 and the polymer bath 91 through an applicator 92 at the outlet of the polymer bath. A reticulation device 93 is provided at the outlet of the device.

In the various examples of devices described above, at the start of the coating operation, the chamber 31 and the pot 3 are put under neutral gas, and then the pot is heated. The metal may be either present in the pot at the start of the heating process or added subsequently through the inlet reserved for this purpose.

The method of the invention, applied in a device described above, gave the following results during the coating of a fiber, using the following characteristics;
   Metal: indium
   Polymer: epoxy acrylate
   Temperature of metal: 160° C.
   Depression: 3500 Pa with respect to atmospheric pressure.
   Atmosphere of pot: argon
   Atmosphere of chamber: argon
   Diameter of fiber guide: 0.3 mm.
   Diameter of fiber: 110 um
   Thickness of metallic coating: 5 um
   Thickness of polymer coating: 25 um
   Speed of fiber drawing: 20m/min The multiple mode fiber thus obtained exhibits added losses of 0.8dB/km at 840 nm and 0.6 dB/km at 1,300 nm, an initial mechanical strength of 0.25 samples of 4.5 GPa and a value n of 45.

With the same operating conditions as in the above example, the following results were obtained by modifying the depression and the diameter of the fiber in the following way:
   Partial vacuum: 500 pA with respect to atmospheric pressure;
   Atmosphere of chamber: Argon + 2% oxygen
   Diameter: 125 um
   The following results:
   The initial mechanical strength of a fiber of this type is 2.5 GPa for 1m samples and the value n is 60.

It is obvious that the above examples of numerical values are given only for a better understanding of the invention and that other numerical examples may be considered without departing from the scope of the invention.

What is claimed is:

1. A method for the impervious metallic coating of an optical fiber, said method comprising the steps of:
   (a) passing the optic fiber downwardly through a fiber guide;
   (b) providing molten metal above the fiber guide and around the optic fiber; and
   (c) creating a pressure differential such that the pressure above the molten metal is less than the pressure around the optic fiber beneath the fiber guide.

2. A method as recited in claim 1 and comprising the further step of providing a neutral gas atmosphere above the molten metal.

3. A method as recited in claim 2 and comprising the further steps of:
   (a) cleaning the metal before it is melted and
   (b) keeping the molten metal in a neutral gas until it is used.

4. A method as recited in claim 1 wherein the pressure differential is created by reducing the pressure above the molten metal.

5. A method as recited in claim 1 wherein the pressure differential is created by increasing the pressure around the optic fiber beneath the fiber guide.

6. A method as recited in claim 1 and comprising the further step of providing a neutral gas atmosphere beneath the fiber guide.

7. A device for the impervious metallic coating of an optic fiber, said device comprising:
   (a) a pot which, in use, contains a molten metal;
   (b) a hole for the passage of an optic fiber in the upper part of said pot;
   (c) a fiber guide in the bottom part of said pot in alignment with said hole; and
   (d) first means for creating a pressure differential in said pot such that, in use, the pressure in said pot above the molten metal is less than the pressure around the optic fiber beneath said fiber guide, wherein:
   (e) said pot is located in a chamber and
   (f) said first means creates a pressure differential between the inside of said pot and the inside of said chamber outside said pot.

8. A device as recited in claim 7 wherein said pot comprises a removable lid in which said hole is located.

9. A device as recited in claim 7 wherein said first means comprises means for reducing the pressure in said pot above the molten metal.

10. A device as recited in claim 7 wherein said first means comprises means for increasing the pressure around the optic fiber beneath said fiber guide.

11. A device as recited in claim 7 and further comprising second means for introducing a neutral gas into said pot above the molten metal.

12. A device as recited in claim 7 and further comprising an outlet chamber in fluid communication with said fiber guide.

13. A device as recited in claim 12 and further comprising third means for introducing a neutral gas into said chamber.

14. A device as recited in claim 7 wherein:
   (a) said first means comprises a pump connected to said pot by a first tube:
   (b) said device further comprises a pressure difference measuring apparatus connected to said pot by a second tube and to said chamber by a third tube; and
   (c) said pressure difference measuring apparatus is operatively connected to said pump so as to control the output of said pump.

15. A device for the impervious metallic coating of an optic fiber, said device comprising:
   (a) a pot which, in use, contains a molten metal;
   (b) a hole for the passage of an optic fiber in the upper part of said pot;
   (c) a fiber guide in the bottom part of said pot in alignment with said hole;
   (d) first means for creating a pressure differential in said pot such that, in use, the pressure in said pot above the molten metal is less than the pressure around the optic fiber beneath said fiber guide; and 16. A device as recited in claim 15 wherein said pot comprises a removable lid in which said hole is located.

17. A device as recited in claim 15 wherein said first means comprises means for reducing the pressure in said pot above the molten metal.

18. A device as recited in claim 15 wherein said first means comprises means for increasing the pressure around the optic fiber beneath said fiber guide.

19. A device as recited in claim 15 and further comprising second means for introducing a neutral gas into said pot above the molten metal.

20. A device as recited in claim 15 and further comprising an outlet chamber in fluid communication with said fiber guide.

21. A device as recited in claim 20 and further comprising third means for introducing a neutral gas into said chamber.

* * * * *

UNITED STATES PATENT AND TRADEMARK OFFICE
CERTIFICATE OF CORRECTION

PATENT NO. : 4,853,258
DATED : August 01, 1989
INVENTOR(S) : Jean GOMBERT, et al It is certified that error appears in the above-identified patent and that said Letters Patent is hereby corrected as shown below:

On the Title Page, Item [22], the filing date is incorrect, it should read as follows:

--June 30, 1987--

Signed and Sealed this

Fifteenth Day of May, 1990

*Attest:*

HARRY F. MANBECK, JR.

*Attesting Officer*      *Commissioner of Patents and Trademarks*